(12) United States Patent
Liu et al.

(10) Patent No.: US 8,270,272 B2
(45) Date of Patent: Sep. 18, 2012

(54) RECORDING POWER CALIBRATING METHOD FOR IMPROVING SEEKING STABILITY ON RECORDING POWER CALIBRATION AREA

(75) Inventors: Yao Wen Liu, Hsin Chu (TW); Ching-Chuan Chen, Pan Chiao (TW); Shu Fan Lin, Tai Nan (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 0 days.

(21) Appl. No.: 13/312,749

(22) Filed: Dec. 6, 2011

(65) Prior Publication Data

US 2012/0075974 A1    Mar. 29, 2012

Related U.S. Application Data

(62) Division of application No. 12/357,827, filed on Jan. 22, 2009, now Pat. No. 8,098,551.

(30) Foreign Application Priority Data

Jan. 23, 2008    (TW) ............................... 97102439 A

(51) Int. Cl.
*G11B 7/00*    (2006.01)

(52) U.S. Cl. ................ 369/47.53; 369/59.11; 369/53.26
(58) Field of Classification Search ........................ None
See application file for complete search history.

(56) References Cited

U.S. PATENT DOCUMENTS

| 7,023,773 | B2 | 4/2006 | Park |
| 2003/0063535 | A1 | 4/2003 | Shoji et al. |
| 2005/0025013 | A1 | 2/2005 | Yamamoto |
| 2006/0203647 | A1 | 9/2006 | Yu et al. |

*Primary Examiner* — Van Chow
(74) *Attorney, Agent, or Firm* — Muncy, Geissler, Olds & Lowe, PLLC

(57) ABSTRACT

In an optimal recording power calibration method for improving seeking stability on a recording power calibration area, a specific area serves as a data recording area during an optimal recording power calibration, wherein a length of the specific area is such that a plurality of times of optimal recording power calibrations can be performed. The method includes: an optimal recording power calibration step of recording, with different recording power, a first length of calibration data in the specific area, and calibrating optimal recording power, wherein a data sector recorded in this step is defined as a calibration recording sector; and a data recording step of recording, with data recording power, a second length of information having a logical address beside the calibration recording sector of the specific area, wherein a data sector recorded in the step is defined as an information recording sector.

5 Claims, 4 Drawing Sheets

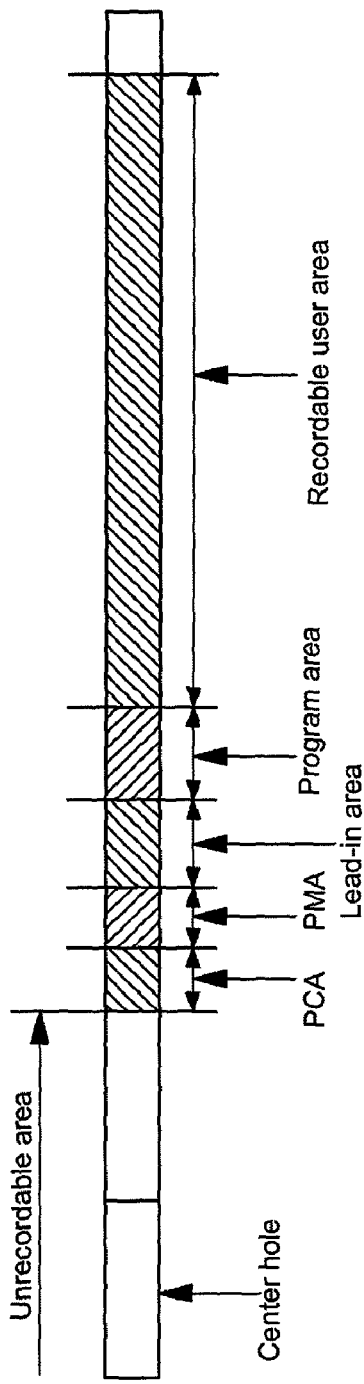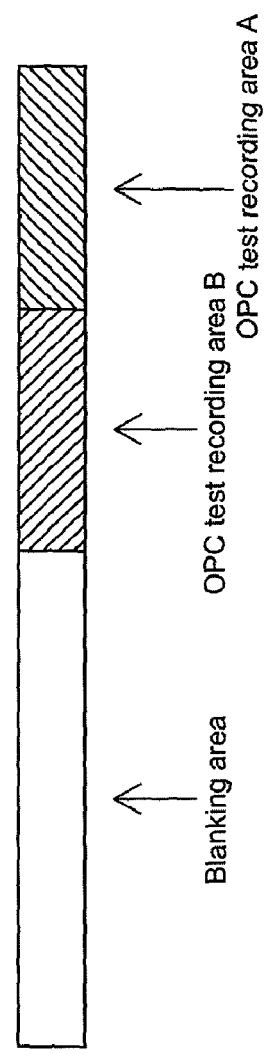
FIG. 1 (Prior Art)
FIG. 2 (Prior Art)

RECORDING POWER CALIBRATING METHOD FOR IMPROVING SEEKING STABILITY ON RECORDING POWER CALIBRATION AREA

CROSS REFERENCE TO RELATED APPLICATIONS

This application is a Divisional of application Ser. No. 12/357,827 filed on Jan. 22, 2009, now U.S. Pat. No. 8,098,551 for which priority is claimed under 35 USC §120; and this application claims priority of Application No. 097102439 filed in Taiwan R.O.C. on Jan. 23, 2008 under 35 USC 119, the entire content of all of which are hereby incorporated by reference.

BACKGROUND OF THE INVENTION

1. Field of Invention

The invention relates to an optimal recording power calibration method for improving seeking stability on a power calibration area, and more particularly to an optimal recording power calibration method for improving seeking stability on the power calibration area according to a blanking area reserving step and/or a data recording step, which are/is newly added.

2. Related Art

FIG. 1 shows a data distribution area of typical optical disk. Referring to FIG. 1, the optical disk includes a center hole, an unrecordable area, a power calibration area (PCA), a programmable memory area (PMA), a lead-in area, a program area and a recordable user area. Thus, when an optimal recording power calibration step is being performed, the power calibration area serves as a test recording area. The optimal recording power calibration step pertains to the prior art, so detailed descriptions will be omitted.

FIG. 2 is a schematic illustration showing the distribution of test data recorded onto the power calibration area PCA according a conventional optimal recording power calibration method. As shown in FIG. 2, no reserved blanking area or optimal (or preferred) power area exists between the OPC test recording area A and the OPC test recording area B adjacent thereto. Thus, the conventional optimal recording power calibration method has the following drawbacks.

First, most of the recording power used in the power calibration area is not the optimal recording power, so its logical address (or referred to as a RF ID) cannot be easily decoded.

Second, the physical addresses (or referred to as wobble IDs) of some disks cannot be decoded easily after the disks are recorded.

Because the first and second factors cause the poor seeking stability of the optical storage device on the power calibration area from the optical storage disk, a longer seeking time is needed or even the seeking fails.

SUMMARY OF THE INVENTION

It is therefore an object of the invention to provide an optimal recording power calibration method for improving seeking stability on a power calibration area, wherein a blanking area reserving step, and/or a data recording step are/is added to effectively enhance the seeking stability, particularly the seeking performance of the power calibration area.

The invention achieves the above-identified object by providing an optimal recording power calibration method for improving seeking stability on a power calibration area. In the optimal recording power calibration method, a specific area serves as a data recording area during the recording power calibration, and a length of the specific area is such that a plurality of times of optimal recording power calibrations can be performed. The method includes: an optimal recording power calibration step for recording, with different recording power, a first length of calibration data in the specific area, and calibrating the optimal recording power, wherein a data sector recorded in this step is defined as a calibration recording sector; and a data recording step for recording, with data recording power, a second length of information having a logical address beside the calibration recording sector of the specific area. A data sector recorded in this step is defined as an information recording sector such that the seeking stability in the specific area is enhanced according to a property that the information recording sector has a logical address when a next power calibration is performed.

A blanking area is reserved between the calibration recording sector in the optimal recording power calibration step and the information recording sector in a previous optimal recording power calibration such that the seeking stability on the specific area is enhanced according to a physical address of the blanking area when the next power calibration is performed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 1 shows a data distribution area of a typical optical disk.

FIG. 2 is a schematic illustration showing the distribution of test data recorded onto a power calibration area PCA according a conventional optimal recording power calibration method.

DETAILED DESCRIPTION OF THE INVENTION

The present invention will be apparent from the following detailed description, which proceeds with reference to the accompanying drawings, wherein the same references relate to the same elements.

The optimal recording power calibration method for improving the seeking stability on the power calibration area will be described with reference to the accompanying drawings.

Figure 3A:
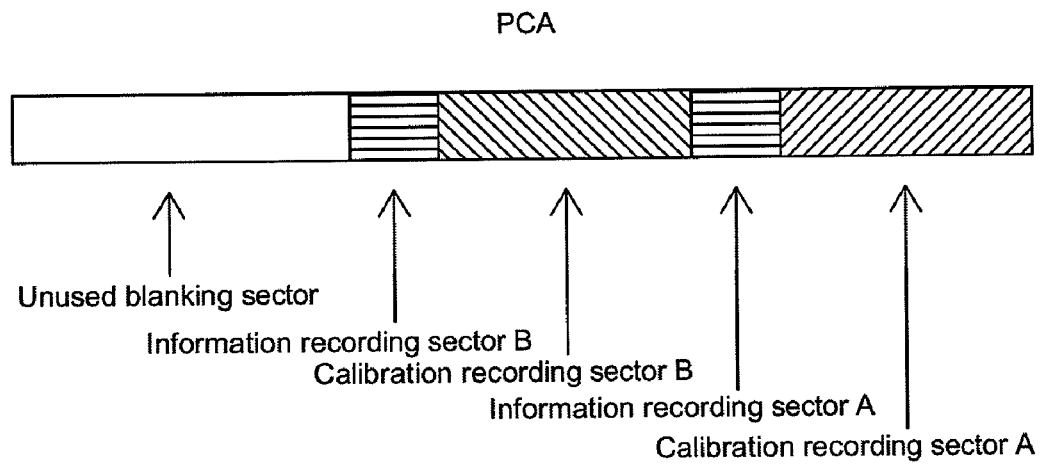
FIG. 3A is a schematic illustration showing the distributions of the test data, recorded onto the power calibration area PCA, and the normally recorded data in an optimal recording power calibration method for improving seeking stability on the power calibration area according to a first embodiment of the invention.
Figure 3B:
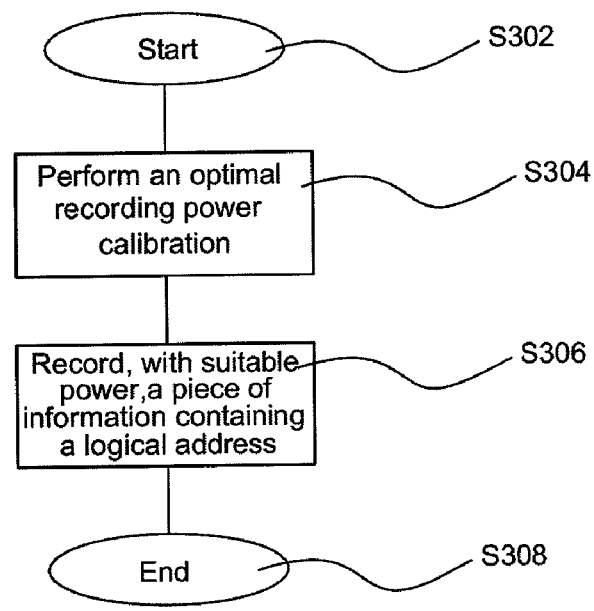
FIG. 3B is a flow chart showing the first embodiment.

FIG. 3A is a schematic illustration showing the distributions of the test data, recorded onto the power calibration area PCA, and the normally recorded data in an optimal recording power calibration method for improving seeking stability on the power calibration area according to a first embodiment of the invention. FIG. 3B is a flow chart showing the first embodiment. As shown in FIG. 3A, a calibration recording sector A and an information recording sector A are sectors recorded during the first recording power calibration, and a calibration recording sector B and an information recording sector B are sectors recorded during the second recording power calibration.

The implemented steps of FIG. 3A will be described with reference to FIG. 3B. The optimal recording power calibration method for improving the seeking stability on the power calibration area according to the first embodiment of the invention will be described in the following. First, an optimal recording power calibration step is performed to record a first length of test data in the power calibration area PCA (S304), such as the calibration recording sector A or the calibration recording sector B in FIG. 3A. Then, a second length of information containing a logical address is recorded, with data recording power, onto the power calibration area PCA (S306), such as the information recording sector A or the information recording sector B in FIG. 3A. The power calibration area PCA may also be a reserved area of the optical disk. The data recording power may be optimal recording power obtained in the optimal recording power calibration step (S304), and may be recording power (the logical address thereof may be obtained by decoding) capable of ensuring the writing quality, or recording power determined in advance. Thus, the information containing the logical address is recorded, with the data recording power, onto the information recording sector A or the information recording sector B, and it is possible to ensure that the correct logical address can be utilized when the seeking is performed in the power calibration area. So, it is possible to prevent the problem that the logical address cannot be easily decoded because most of the recording power for the power calibration area PCA is not the optimal recording power. The second length may be the shortest logic length for decoding the logical addresses of various optical storage disks. The so-called optimal recording power calibration step is to record, with different recording power, a first length of calibration data in the power calibration area PCA and to calibrate best power.

Figure 4A:
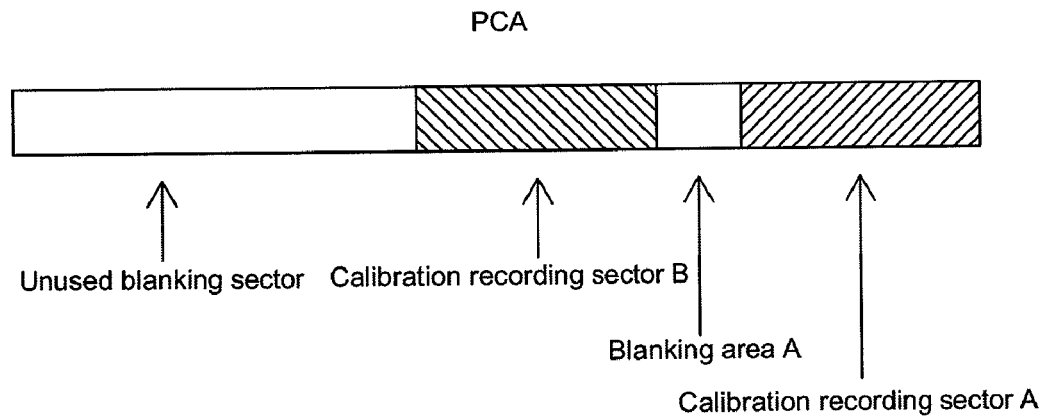
FIG. 4A is a schematic illustration showing the distributions of the test data, recorded onto the power calibration area PCA, and the reserved blanking area in the optimal recording power calibration method for improving seeking stability on the power calibration area according to a second embodiment of the invention.
Figure 4B:
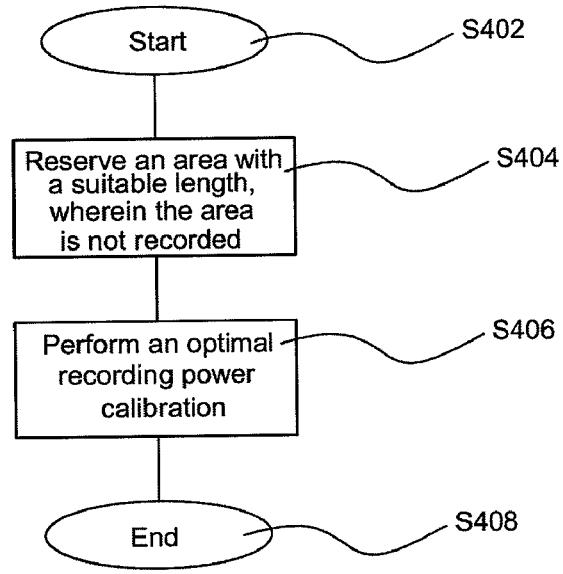
FIG. 4B is a flow chart showing the second embodiment.

FIG. 4A is a schematic illustration showing the distributions of the test data, recorded onto the power calibration area PCA, and the reserved blanking area in the optimal recording power calibration method for improving seeking stability on the power calibration area according to a second embodiment of the invention. FIG. 4B is a flow chart showing the second embodiment. As shown in FIG. 4A, the calibration recording sector A is the sector recorded during the first recording power calibration, the calibration recording sector B is the sector recorded during the second recording power calibration, and the blanking sector A is a blanking area reserved in the calibration recording sector B during the second recording power calibration and calibration recording sector A during the first (previous) recording power calibration.

The implemented steps of FIG. 4A will be described with reference to FIG. 4B. The optimal recording power calibration method for improving the seeking stability on the power calibration area according to the second embodiment of the invention will be described in the following. First, an area with a suitable length (e.g., a third length) is reserved beside the previous calibration recording sector of the power calibration area PCA before the optimal recording power calibration step is implemented, and no recording operation is performed in the area (S404). Next, the optimal recording power calibration step is performed to record a first length of test data onto the power calibration area PCA (S406). That is, a blanking area, onto which recording is not implemented, is reserved between two adjacent calibration recording sectors A and B. Thus, the wobble signal generated by the blanking sector can ensure that the correct physical address may be utilized when the power calibration area is subsequently sought. So, it is possible to avoid the problem that the wobble signal on the disk is damaged and that the physical address cannot be easily decoded, wherein the problem is caused because most of the recording power in the power calibration area of the disk is not the optimal recording power. The so-called third length may be a shortest physical length required for decoding physical addresses of various optical storage disks.

Figure 5A:
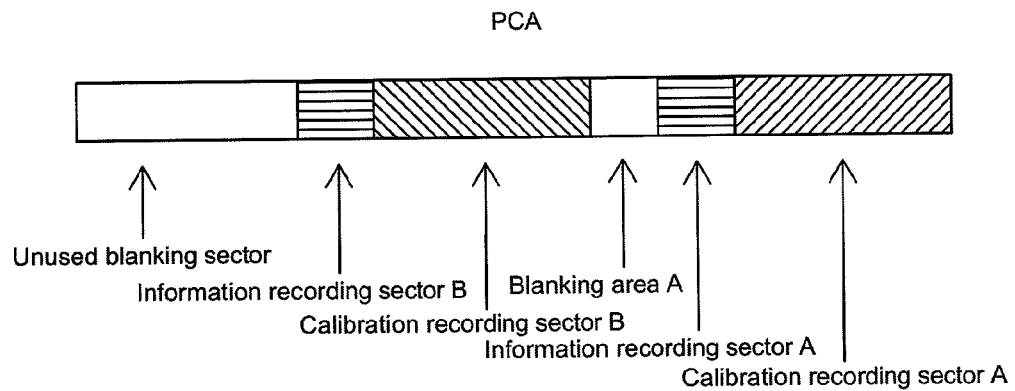
FIG. 5A is a schematic illustration showing the distributions of the test data, recorded onto the power calibration area PCA, the normally recorded data and the reserved blanking area in the optimal recording power calibration method for improving seeking stability on the power calibration area according to a third embodiment of the invention.

FIG. 5A is a schematic illustration showing the distributions of the test data, recorded onto the power calibration area PCA, the normally recorded data and the reserved blanking area in the optimal recording power calibration method for improving seeking stability on the power calibration area according to a third embodiment of the invention. As shown in FIG. 5A, the calibration recording sector A and the information recording sector A are sectors recorded during the first recording power calibration, the calibration recording sector B and the information recording sector B are sectors recorded during the second recording power calibration, and the blanking sector A is the blanking area reserved in the calibration recording sector B during the second recording power calibration and calibration recording sector A during the first (previous) recording power calibration.

Figure 5B:
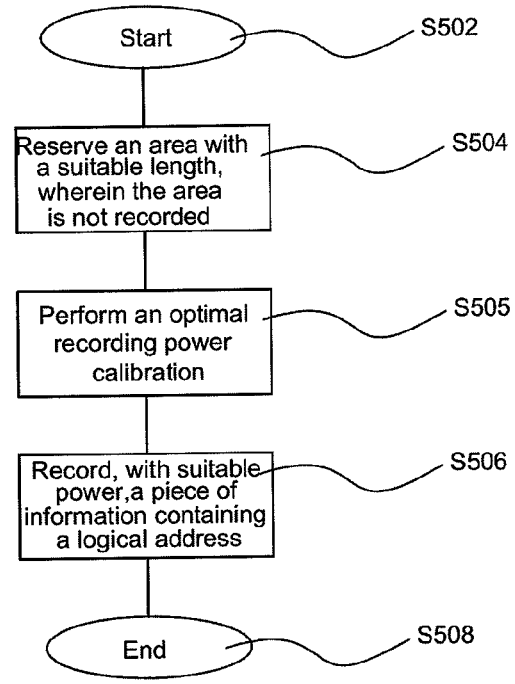
FIG. 5B is a flow chart showing the third embodiment.

The implemented steps of FIG. 5A will be described with reference to FIG. 5B. The optimal recording power calibration method for improving the seeking stability on the power calibration area according to the third embodiment of the invention will be described in the following. First, before the optimal recording power calibration step is implemented, an area with a suitable length (e.g., a blanking area A with a third length) is reserved beside the previous calibration recording sector of the power calibration area PCA, and no recording operation is performed in this area (S504). Next, the optimal recording power calibration step is performed to record a first length of test data onto the power calibration area PCA (S505), such as the calibration recording sector A or the calibration recording sector B in FIG. 5A. Finally, a second length of information with a logical address is recorded, with data recording power, onto the power calibration area PCA (S506), such as the information recording sector A and the information recording sector B in FIG. 5A. Because the information containing the logical address is recorded, with the data recording power, on the information recording sector A and the information recording sector B, it is possible to ensure that the correct physical address may be utilized when the power calibration area is subsequently sought. Furthermore, the wobble signal generated by the blanking sector A can ensure that the correct physical address may be utilized. So, it is possible to avoid the problem that the logical addresses and the physical addresses of the disks cannot be easily decoded after the disks are recorded. The so-called second length may be a shortest physical length required for decoding logical addresses of various optical storage disks. The so-called third length may be a shortest physical length required for decoding physical addresses of various optical storage disks.

Thus, the optimal recording power calibration method for the invention can effectively improve the seeking stability, especially the seeking performance, on the power calibration area according to the blanking area reserving step and/or the data recording step, which are/is newly added.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A recording power calibration method, for improving seeking stability on a power calibration area, the method being for performing an optimal recording power calibration once when an optical disk is placed into an optical drive, and thus obtaining optimal recording power, wherein a specific area serving as a data recording area during the optimal recording power calibration, and a length of the specific area being such that a plurality of times of optimal recording power calibrations can be performed, the method comprising:

an optimal recording power calibration step, for recording, with a plurality of recording powers, a first length of calibration data in the specific area, and calibrating the optimal recording power, wherein a data sector recorded in this step is defined as a calibration recording sector, wherein an optimal recording power calibration has been performed at the optical disk before the optimal recording power calibration step, wherein a blanking area is reserved between the calibration recording sector corresponding to the optimal recording power calibration step and the calibration recording sector corresponding to the optimal recording power calibration step previous.

2. The method according to claim 1, wherein the specific area is a power calibration area of the optical disk.

3. The method according to claim 1, wherein the specific area is a reserved area of the optical disk.

4. The method according to claim 1, wherein the first length is greater than the data sector.

5. The method according to claim 1, further comprising:

a data recording step, for recording an information recording sector with data recording power for a second length of information having a logical address beside the calibration recording sector of the specific area, such that the seeking stability in the specific area is enhanced according to logical address of the information recording sector when a next power calibration is performed, wherein the blanking area is reserved between the calibration recording sector corresponding to the optimal recording power calibration step and the information recording sector in the optimal recording power calibration step previous.

* * * * *